United States Patent Office 3,409,687
Patented Nov. 5, 1968

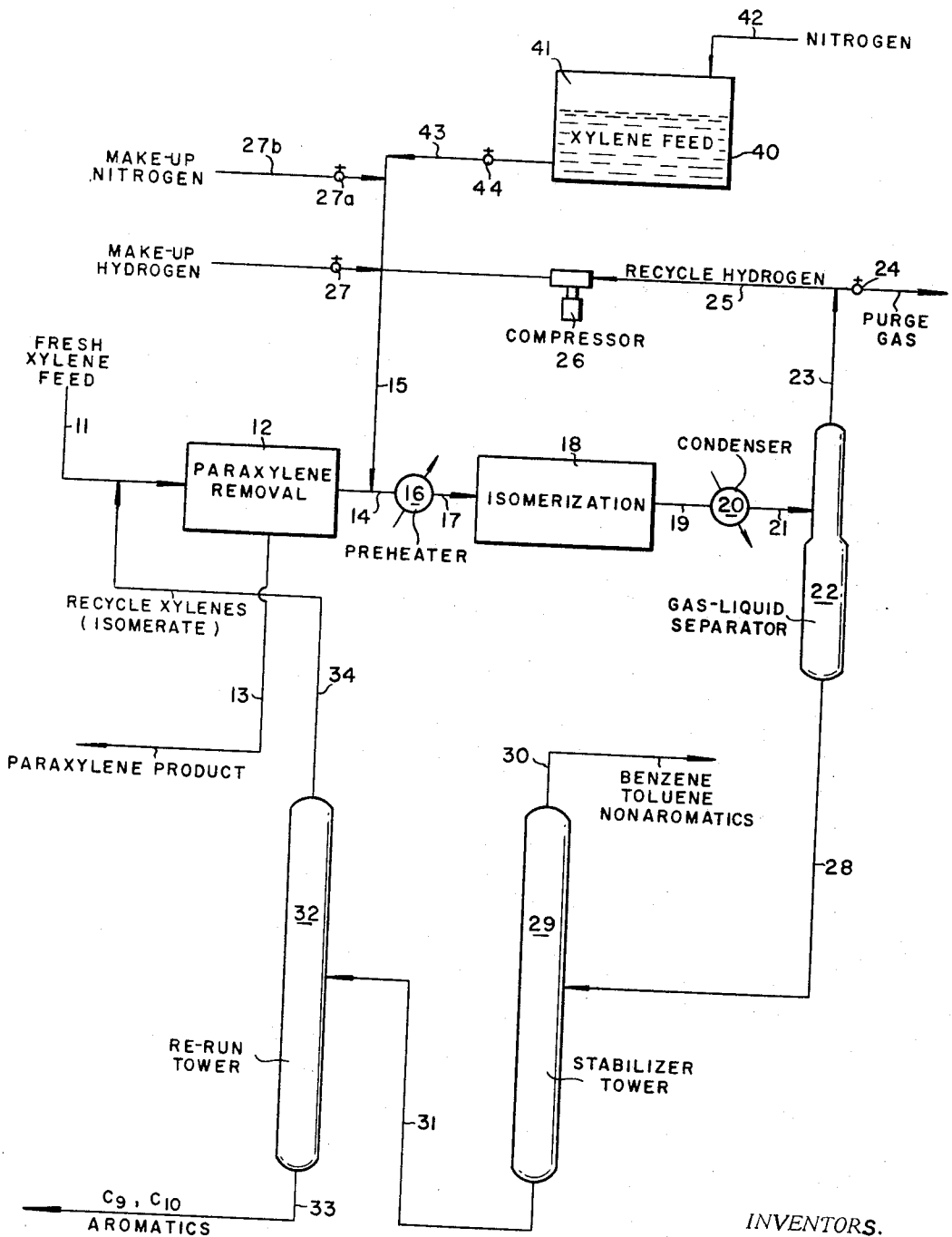

3,409,687
ISOMERIZING POLYMETHYLBENZENE
Edward F. Wadley and Robert D. Wesselhoft, Baytown, Tex., assignors to Esso Research and Engineering Company
Filed Dec. 7, 1967, Ser. No. 688,952
10 Claims. (Cl. 260—668)

ABSTRACT OF THE DISCLOSURE

Polymethylbenzene is isomerized by contact under specific isomerization conditions with a silica-alumina molybdenum-containing catalyst, which has been pretreated with hydrogen under specific temperature and pressure conditions, in the presence of hydrogen and nitrogen.

CROSS-REFERENCES TO RELATED APPLICATIONS

This application contains subject matter common to Ser. No. 604,853 filed Dec. 27, 1966, and Ser. No. 604,789 filed Dec. 27, 1966, and is an improvement thereover.

BACKGROUND OF THE INVENTION

(1) Field of the invention

The present invention is directed to the isomerization of a polymethylbenzene having from 2 to 4 methyl groups. More particularly, the invention is concerned with the isomerization of a xylene. In its more specific aspects, the invention is concerned with isomerization of a polymethylbenzene over a catalyst under conditions wherein catalyst life is prolonged.

(2) Description of the prior art

It is known to isomerize polymethylbenzene over solid catalysts in the presence of hydrogen. It is also known to conduct such isomerizations in the presence of so-called inert gases such as nitrogen and the like. Isomerization of xylene has also been conducted in the presence of ammonia alone or with water or steam. None of these isomerization reactions, however, has utilized both hydrogen and nitrogen to obtain new and unobvious results in prolonging catalyst life and achieving high conversions of one isomer to a selected isomer. The present invention allows this to be done.

Specific prior art considered in connection with the present invention include:

U.S. 3,293,314
Japanese Patent No. S-37/9,469 (1962)
Japanese Patent No. S-38/19,276 (1963)
German 956,674, Jan. 24, 1957 (Class 12k)
N. I. Shujkin and D. Batyn, "The Isomerization of M-Xylene on an Alumino-Silicate Catalyst in the Presence of Activators" (Magazine-Vestnik of Moscow University, No. 3:247–51, 253–57) (1957)

SUMMARY OF THE INVENTION

The present invention may be briefly described and summarized as involving the isomerization of a polymethylbenzene by contact with a shaped silica-alumina molybdenum containing catalyst which has been exposed to a specific hydrogen treatment at specific temperatures for a selected length of time in which the isomerization is conducted under isomerization conditions in the presence of both hydrogen and nitrogen, the amount of nitrogen being maintained at a selected level by periodically or continually releasing gas or by introducing the nitrogen intermittently or by reducing the amount of nitrogen from time to time. Conveniently, the nitrogen may be introduced by dissolving it in the feed polymethylbenzene or by blanketing the feed with nitrogen.

ISOMERIZATION CONDITIONS AND FEEDS

In the practice of the present invention, a shaped silica-alumina molybdenum-containing catalyst is exposed to a pressure of at least 100 p.s.i.g. followed by heating said catalyst in the presence of hydrogen at said pressure to a temperature within the range from about 650° to no greater than 850° F. and maintaining said temperature in the presence of hydrogen for at least 16 hours. The heated catalyst is then contacted with a polymethylbenzene having from 2 to 4 methyl groups at an isomerization temperature within the range from about 500° to about 850° F. under isomerization conditions in the presence of hydrogen and nitrogen to form a selected isomer.

Isomerization conditions include a pressure within the range from about 100 to about 700 p.s.i.g., a feed rate of from about 0.1 to about 10 liquid v./v./hour, and a hydrogen to polymethylbenzene mole ratio within the range from about 2:1 to about 20:1, the isomerization temperature being selected to provide the lowest temperature within said range of isomerization temperatures consistent with production of a selected level of the selected isomer as determined by the relationship:

$$K_x = \frac{\text{Percent selected isomers}}{\text{Percent selected isomer} + \text{sum of the percent of other isomers}}$$

with the maximum theoretical value of $K_x$ being the thermodynamic equilibrium value of the selected isomer at said selected lowest temperature.

The amount of nitrogen employed should be sufficient to provide an amount in the gas phase within the range from about 0.1 to about 4 mol percent. Stated another way, the amount of nitrogen in the recycle gas should be maintained at a level no greater than within the range from about 0.1 to about 4% by volume.

The polymethylbenzene which is employed as a feed to the present invention is a polymethylbenzene having from 2 to 4 methyl groups on the benzene ring and includes orthoxylene, metaxylene, and paraxylene, 1,2,4-trimethylbenzene, 1,3,5-trimethylbenzene, 1,2,3-trimethylbenzene, and the tetramethylbenzenes including 1,2,4,5-tetramethylbenzene, 1,2,3,5-tetramethylbenzene and 1,2,3,4-tetramethylbenzene.

A catalyst employed in the present invention is the catalyst described and claimed in the Amir application supra. This catalyst is preferably produced by subjecting shapes of silica-alumina containing from about 10% to about 50% by weight of alumina and about 50% to about 90% of silica and containing from about 3% to about 10% by weight molybdenum as $MoO_3$ on a dry basis to drying at a temperature below 650° F. for a time within the range from about one to about five hours. The shapes may preferably be heated to a temperature below about 950° F. before the shapes are impregnated with molybdenum as described in the Amir application supra.

In the method of the present invention, the catalyst must be activated by hydrogen treatment at a pressure of at least 100 p.s.i.g. and a temperature in the range from about 650° to no greater than 850° F. at said pressure and temperature for at least 16 hours. The catalyst must not be exposed to temperatures in excess of 250° in the presence of air or hydrogen at pressures below 100 p.s.i.g. The pressures at which the catalyst is heated and maintained at these temperatures may range from 100 to 1,000 p.s.i.g. The times employed may range from 16 hours up to 100 hours although the heating times may be greater than 100 hours if desired.

BRIEF DESCRIPTION OF THE DRAWING

The present invention will be further illustrated by reference to the drawing in which:

FIGURE 1 is a flow diagram illustrating a best mode and embodiment contemplated.

DESCRIPTION OF THE PREFERRED MODE AND EMBODIMENT WITH RESPECT TO THE DRAWING

Referring now to the drawing, and particularly to FIGURE 1, numeral 11 designates a charge line by way of which a paraxylene-containing fraction boiling within the range from about 277° to about 291° F. obtained from a source not shown is introduced into a paraxylene removal zone 12 which suitably is a low-temperature crystallization zone wherein paraxylene is crystallized and removed as paraxylene crystals by way of line 13. Methods for removing paraxylene from fractions containing paraxylene are well known and, hence, further details thereof are not given. The filtrate from paraxylene removal zone 12 is discharged from zone 12 by line 14 and is admixed with hydrogen and nitrogen introduced by line 15 from a source which will be described further. The mixture of hydrogen, nitrogen, and low paraxylene content feed is introduced into a preheating zone 16 wherein the temperature is raised to a temperature within the range from about 500° to about 850° F. and the heated mixture of hydrogen, nitrogen, and feed is introduced by line 17 into an isomerization zone 18 which may comprise a vertical bed of silica-alumina molybdenum-containing isomerization catalyst where the feed stock is contacted with the catalyst under isomerization conditions in the presence of hydrogen and nitrogen introduced by line 15.

Prior to initiating the isomerization operation, it is necessary that the catalyst be treated to activate same and to this end the catalyst in isomerization zone 18, prior to starting the feed to zone 18, is pressured to at least 100 p.s.i.g. with hydrogen after purging the air by the use of nitrogen, and the hydrogen is allowed to flow over the catalyst for a period of 4 to 24 hours until a temperature from about 700° to no greater than 850° F. is attained. Thereafter the temperatures are maintained at said temperature and said pressure for at least 16 hours and preferably a greater number of hours, from 24 to 100 hours. After 100 hours, the catalyst is completely activated. A greater period of activation may be used since no detrimental effects have been observed from over-activation. If the temperature exceeds 850° F., the catalyst is harmed by calcination which causes excessive disproportionation of the feed which the present invention avoids.

After the catalyst in isomerization zone 18 has been suitably activated as described, the feed introduced by line 17 flows therethrough and the xylene is isomerized to the selected isomer as controlled by the isomerization conditions. The isomerized product is discharged from zone 18 by line 19 and passed through a cooler-condenser 20 and, thence, by line 21 into a gas-liquid separator 22 where a separation is made between a gas phase and a liquid phase. The gas phase containing hydrogen and nitrogen is discharged by line 23 and a portion thereof may be vented from the system by opening valve 24 in line 25 to prevent build-up of nitrogen and/or other gases in the system. Preferably, a major part of the gas from line 23 is recycled by line 25 containing compresser 26 to line 15 for reuse in the process. If insufficient hydrogen and nitrogen are obtained by line 23, make-up hydrogen may be introduced in line 15 by opening valve 27 connecting to an extraneous source of hydrogen not shown. Make-up nitrogen may be introduced by opening valve 27a in line 27b connecting to an extraneous source of nitrogen not shown.

The liquid phase in separator 22 is withdrawn by line 28 and introduced thereby into a stabilizer zone 29 which suitably is a fractional distillation zone equipped with all auxiliary equipment such as vapor-liquid contacting means, heating means, cooling and condensing means, and the like, to provide a separation of lower boiling products from the selected isomer. In this instance a fraction containing benzene, toluene, and nonaromatics may be discharged from zone 29 by line 30 while a fraction containing paraxylene is discharged by line 31 and introduced thereby into a second fractional distillation tower 32 which may be designated a rerun zone which is similarly equipped to zone 29. A heavier fraction containing $C_9$ and $C_{10}$ aromatics may be discharged from zone 32 by line 33 while the desired product is withdrawn by line 34 which connects to line 11 which introduces same to paraxylene removal zone 12 from which the desired product is recovered by line 13. Paraxylene removal zone 12 may connect into xylene storage zone 40 by means not shown, and the xylene feed therein may be stored under a blanket of nitrogen 41 introduced into zone 40 by line 42. In this instance, xylene feed is withdrawn from zone 40 by line 43 controlled by valve 44. Line 43 connects into line 25 which in turn connects into line 15.

Thus, it is seen that nitrogen may be introduced into the system by gas blanketing the feed with nitrogen whereby sufficient nitrogen dissolves therein or the nitrogen may be admixed with the hydrogen.

It will be seen from the description taken with the drawing that the present invention provides a method for producing and recovering a selected isomer from a polymethylbenzene isomerized product. The feed introduced by line 11 may be a trimethylbenzene or a tetramethylbenzene as may be desired.

It is important that the fresh catalyst prior to the activation period not be exposed to a temperature in excess of 250° F. in the presence of air or hydrogen with the pressure below 100 p.s.i.g., preferably 200 p.s.i.g. It is also important in the present invention to maintain the isomerization temperature at the lowest temperature within the range given while producing a selected level of the selected isomer at maximum catalyst life as determined by the $K_x$ relationship given supra under the operating conditions which have been given herein.

The operating conditions are selected such that the selected isomer is produced in a selected amount, preferably just below its equilibrium level to extend the catalyst life to its maximum and to produce maximum amounts of the selected isomer and minimum amounts of by-products such as result from disproportionation reactions.

In the practice of the present invention, it is desirable to employ the lowest temperature within the range of isomerization temperatures given which will give the desired $K_x$ values for the selected isomer at the selected lowest temperature. For paraxylene, this may be within the range from about 23 to about 24. Ultimate conversion to paraxylene is equilibrium limited since $K_x$ paraxylene equals approximately 24.2 at 750° F. Hence, for paraxylene it is necessary to operate at more severe levels except in certain cases as will be discussed later herein. Operations below about 24, say in the neighborhood of 22 to 23.8, will insure that the operation for paraxylene is not too severe.

After proper activation of the catalyst, as has been described, the temperature is lowered with hydrogen flow over the catalyst. After an induction period, say for example about 200 to 250 hours on xylene feed, the catalyst activity will line out at its maximum. At this time the $K_x$ value may be determined to insure that it is in the proper range. The actual $K_x$ value will be a function of the particular catalyst activity, space velocity, $H_2$: polymethylbenzene ratio, pressure, hydrogen purity, temperature, and feed composition and the severity of the operation may be adjusted to give the desired $K_x$ value. The severity normally is adjusted by changing the temperature, hydrogen rate, or the feed rate.

As the activity of the catalyst slowly drops with time of operation, the temperature may be adjusted upward to maintain a desired $K_x$ value. Before reaching 850° F., however, the reaction should be stopped and the catalyst regenerated in order to avoid calcining and subsequent excessive disproportionation, as has been described supra. The catalyst may be regenerated by causing a mixture of 0.25% to 1% oxygen and nitrogen to flow over the mixture of catalyst at 750° F. followed by a repeat burning at 800° F., with complete restoration of catalyst performance. The catalyst should be cooled after regeneration and reactivated as has been described, except that the activation time may be shortened to 1 to 2 hours after regeneration.

A novel aspect of the present invention is the low temperatures that are employed. In other words, with a molybdenum-containing silica-alumina catalyst, it is possible to operate at the low temperatures without the formation of large amounts of nonaromatics, although at the temperatures employed in the present invention equilibrium favors production of nonaromatics. Thus, an unobvious result is obtained.

The present invention has another desirable feature since it has been found that at high severities of operation disproportionation results. In a recycle operation such as described with respect to FIGURE 1, where fresh xylene feed is fed to a paraxylene recovery zone, ethylbenzene in the feed may build up and act as an undesirable diluent. It has been found that the rate of disproportionation of ethylbenzene is higher than the rate of disporportionation of the xylene. Consequently, by operating at high severities the ethylbenzene may be removed at a rate equal to the xylene by disproportionation plus paraxylene product removal. Thus, the ethylbenzene may be kept in balance at a low level.

Feed composition is also important in the present invention since it has been found that this has a marked effect, particularly in the production of paraxylene as illustrated by the $K_x$ value. Feeds in which metaxylene is rich and orthoxylene is at thermodynamic equilibrium or below readily produce paraxylene at equilibrium ($K_x$=24.2). On the other hand, if orthoxylene is above equilibrium, much more severe operation is required to produce paraxylene at the selected $K_x$. The net effect is that the higher the level of orthoxylene, the worse the feed.

OPERATION

A typical commercial isomerization feed stock has the following typical analysis:

| | Mole percent |
|---|---|
| Orthoxylene | 32 |
| Metaxylene | 49 |
| Paraxylene | 10 |
| Ethylbenzene | 9 |

This feed stock was charged to a commercial isomerization reactor containing a catalyst, which had been prepared and pretreated as described supra, for a period of approximately six months under the following typical conditions:

| | Normal | (Range) |
|---|---|---|
| Temperature, ° F | 767 | (750–770) |
| Pressure, p.s.i.g | 230 | (220–235) |
| V./v/hr | 0.9 | (0.8–1.1) |
| Nitrogen, Mole Percent | 3 | (1–4) |
| Hydrogen to Xylene Mol Ratio | 7/1 | (10/1 to 5/1) |

During this period of time the activity of the catalyst declined gradually, the $K_x$ of the product declining from about 23.2 to 22.4. Contemporaneous studies in which nitrogen was not added to this same feed where hydrogen was employed over this same catalyst showed that the loss in catalyst activity, expressed as drop in $K_x$ per unit time, was three times greater for the operation that did not contain nitrogen. In short, the presence of both nitrogen and hydrogen under the isomerization conditions including temperature, pressure, space velocity, and the particular catalyst allowed the achieving of unobvious results.

Heretofore, it had been known that both hydrogen and nitrogen separately could be used in isomerization to form a selected isomer; however, it had not been known that hydrogen and nitrogen could be used simultaneously to achieve vastly improved catalyst life.

As mentioned before, the present invention is applicable, not only to the xylenes, but also to the trimethyl and tetramethyl benzenes. To illustrate the equilibrium values ($K_x$) for the three xylenes, the three trimethylbenzenes, and the three tetramethylbenzenes, the data in the following table is given.

| | Equilibrium Values, $K_x$ | Operating T., ° F. | Min. T., ° F. |
|---|---|---|---|
| p-Xylene | 24.2 | | |
| m-Xylene | 52.8 | 750 | 700 |
| o-Xylene | 23.0 | | |
| 1,2,4 trimethylbenzene | 63 | | |
| 1,3,5 trimethylbenzene | 28 | 625 | 570 |
| 1,2,3 trimethylbenzene | 9 | | |
| 1,2,4,5 tetramethylbenzene | 40.5 | | |
| 1,2,3,5 tetramethylbenzene | 50 | 570 | 500 |
| 1,2,3,4 tetramethylbenzene | 9.5 | | |

100–700 p.s.i.g.
H₂/H.C. ratio 2–20.
Space velocity 0.1, 10 v./v./hour.

The nature and objects of the present invention having been completely described and illustrated and the best mode contemplated set forth what we wish to claim as new and useful and secure by Letters Patent is:

1. In a method of isomerizing a polymethylbenzene wherein a shaped silica-alumina molybdenum-containing catalyst is exposed to hydrogen pressure and heated under hydrogen pressure to a temperature within the range from about 650° to no greater than 850° F. and maintained at said temperature in the presence of hydrogen for a sufficient length of time and wherein said heated catalyst is contacted with a polymethylbenzene having from 2 to 4 methyl groups under isomerization conditions in the presence of hydrogen to form a selected isomer in which gas-containing hydrogen is recycled in contacting said polymethylbenzene with said catalyst, the steps which comprise:

conducting said contact in the presence of sufficient introduced nitrogen; and maintaining the amount of nitrogen in said recycle gas at a level no greater than within the range from about 0.1% to about 4% by volume;

whereby the activity of said catalyst in isomerizing said polymethylbenzene is prolonged.

2. A method in accordance with claim 1 in which the nitrogen is introduced dissolved in said polymethylbenzene.

3. A method in accordance with claim 1 in which the nitrogen is introduced as a gas.

4. A method in accordance with claim 1 in which the polymethylbenzene is a xylene.

5. A method in accordance with claim 1 in which the amount of nitrogen is maintained by discharging a portion of the recycle gas from the recycle system.

6. A method in accordance with claim 1 in which the amount of nitrogen is maintained by introducing the nitrogen intermittently.

7. A method in accordance with claim 1 in which the amount of nitrogen is maintained by reducing the amount introduced.

8. A method in accordance with claim 1 in which:
(a) the polymethylbenzene is a xylene;
(b) the amount of nitrogen is maintained by discharging a portion of the recycle gas from the recycle system; and
(c) the nitrogen is introduced dissolved in the polymethylbenzene.

9. A method in accordance with claim 8 in which:
(a) the hydrogen pressure is at least 100 p.s.i.g.;
(b) the catalyst is maintained at said temperature for at least 16 hours;
(c) the contacting is conducted at a temperature within the range of about 500° to about 850° F.; and
(d) the introduced nitrogen is an amount within the range from about 0.1 to about 4 mol percent.

10. A method in accordance with claim 1 in which the polymethylbenzene is trimethylbenzene.

No references cited.

DELBERT E. GANTZ, *Primary Examiner.*

C. R. DAVIS, *Assistant Examiner.*